United States Patent

Koch

[15] 3,677,190

[45] July 18, 1972

[54] SURFACE AUTOMOBILE CONVEYOR

[72] Inventor: Charles Peter Koch, Vancouver, British Columbia, Canada

[73] Assignee: Monarch Western Equipment Ltd., Vancouver, British Columbia, Canada

[22] Filed: Oct. 22, 1970

[21] Appl. No.: 82,876

[52] U.S. Cl. ........................................................104/172 B
[51] Int. Cl. .............................................................B65g 17/24
[58] Field of Search ..............................104/172 B, 173, 178

[56] References Cited

UNITED STATES PATENTS

| | | | |
|---|---|---|---|
| 3,330,223 | 7/1967 | Gaynor | 104/173 |
| 3,530,801 | 9/1970 | Murillo | 104/172 B |
| 3,554,132 | 1/1971 | Hanna | 104/172 B |

*Primary Examiner*—Arthur L. La Point
*Assistant Examiner*—Robert Saifer
*Attorney*—Brian J. Wood

[57] ABSTRACT

An automobile conveyor which has a plurality of automobile pushing units having pushing rollers spaced at intervals along an endless chain which travels over sprockets mounted for rotation about vertical axes. The rollers are swingable in a plane transversely to the chain. Means is provided for selectively swinging any of the rollers on an advance run of the chain into a pushing position behind a tire of a wheel of an automobile so as to move the automobile and means is provided for enabling a roller pushing an automobile to swing away from the tire after the automobile has been moved a required distance.

9 Claims, 8 Drawing Figures

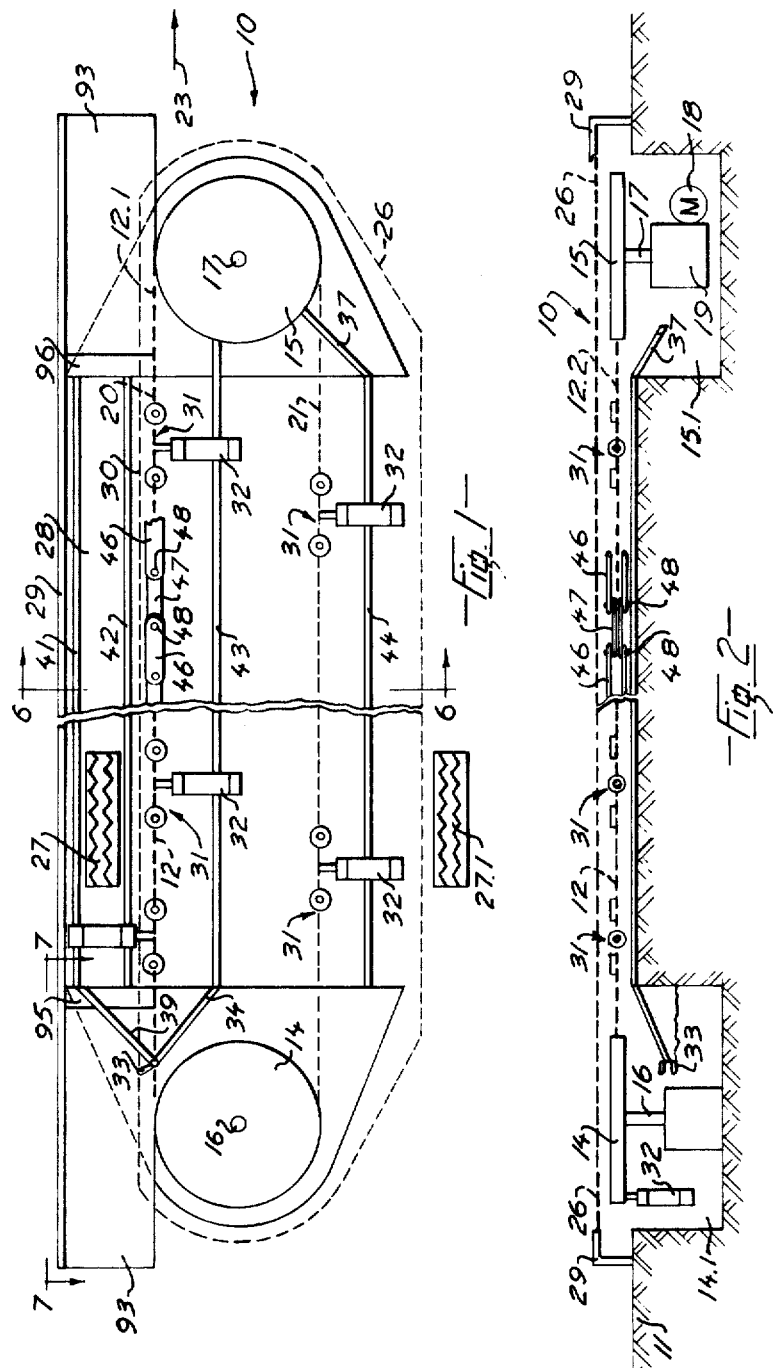

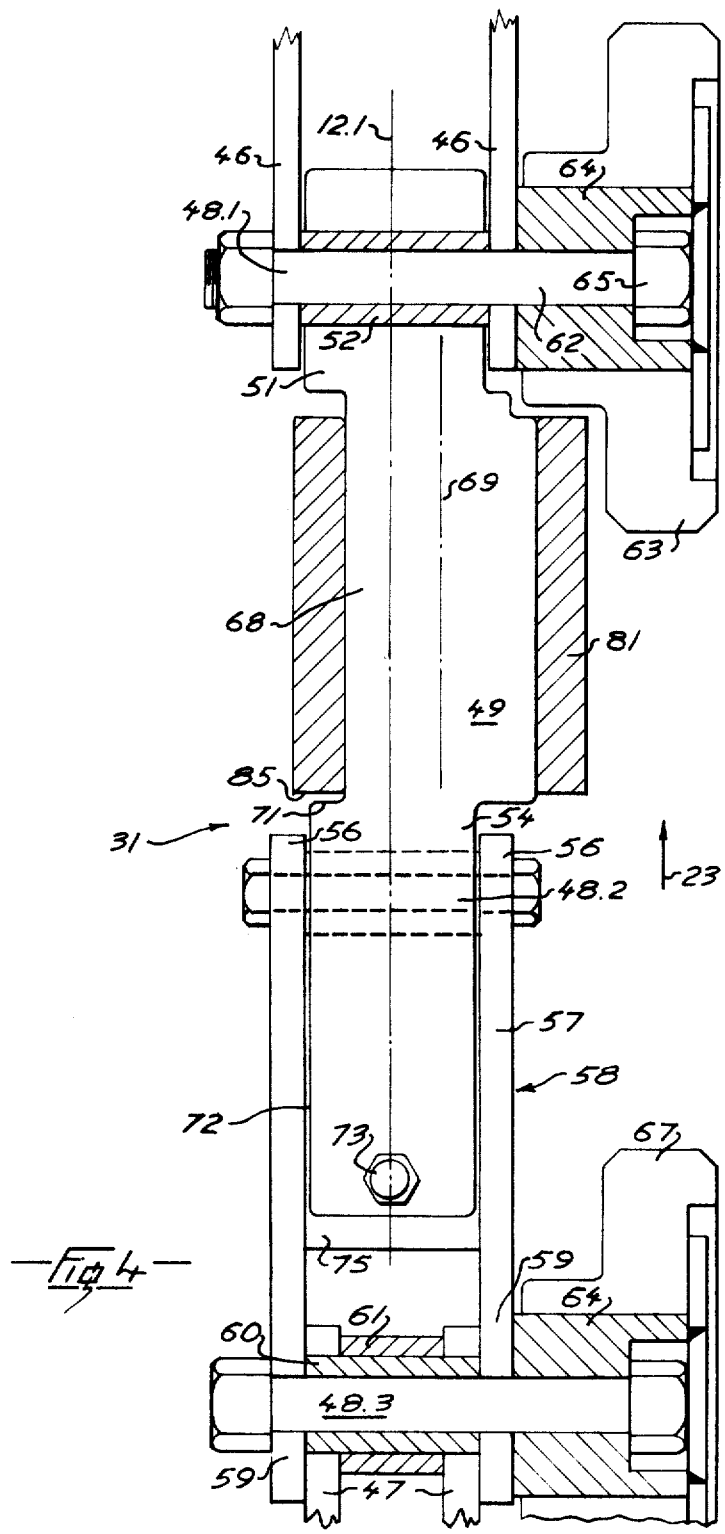

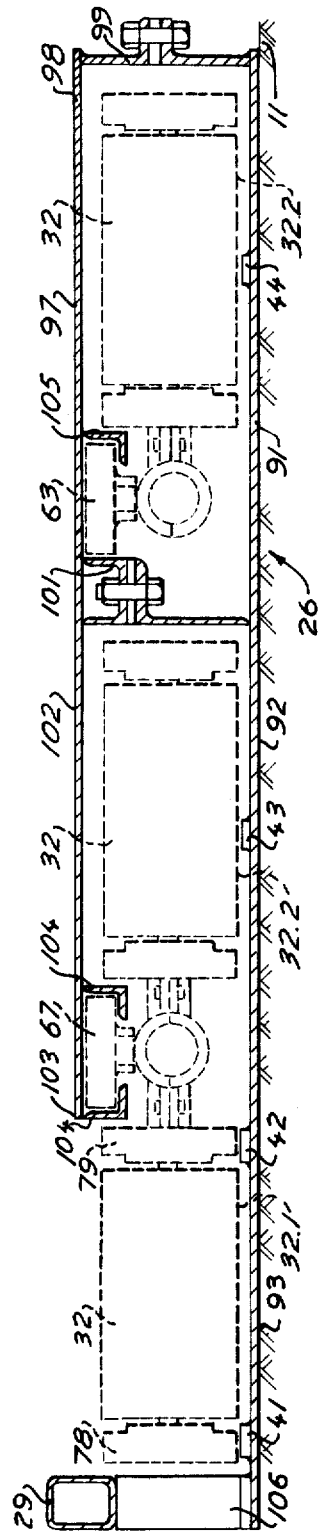
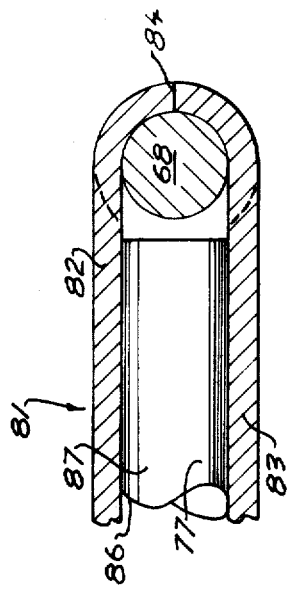
Charles Peter Koch,
Inventor
by Lyle G. Trorey,
Agent

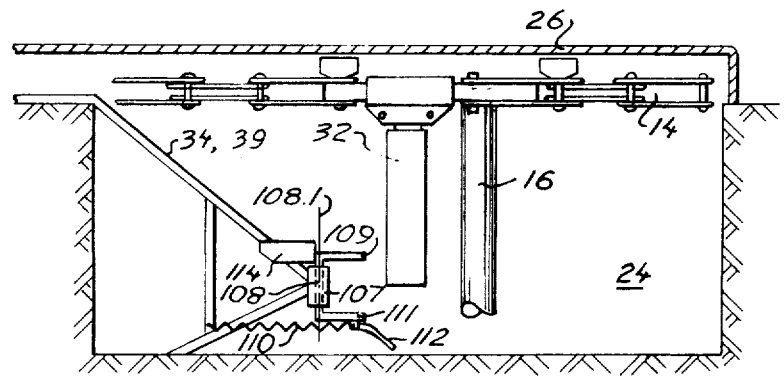
*Fig. 7*
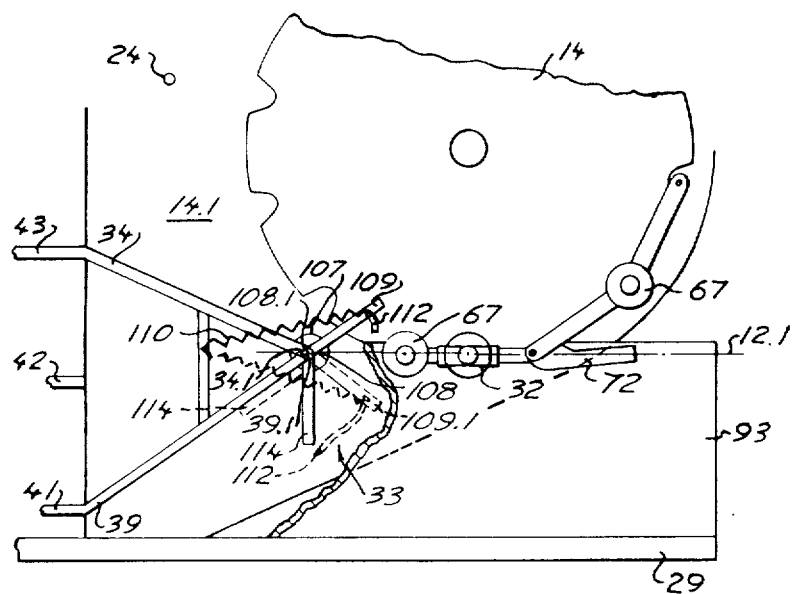
*Fig. 8*
Charles Peter Koch,
Inventor
by 
Lyle G. Trorey,
Agent

SURFACE AUTOMOBILE CONVEYOR

BACKGROUND OF THE INVENTION

1. Field of the Invention

This invention relates to conveyors and, in particular, to automobile conveyors for use in car wash plants.

2. Prior Art

Conveyors for moving automobiles through washing facilities of car wash plants generally include an endless continuously moving chain upon which pushing units are mounted at spaced intervals for engaging a tire of an automobile, usually a front tire, so as to move the automobile through the washing facilities. Conveyors are generally of two main types, trench type and surface type.

In trench type conveyors head and tail sprockets over which the endless chain passes are mounted for rotation about horizontal axes beneath a floor over which the automobiles are moved. Pusher units extend from an upper run of the chain through a slot in the floor so as to engage an automobile tire and move the automobile the length of the conveyor.

Although conveyors of this type are effective they have a number of disadvantages. A trench running the full length of the conveyor must be provided to accommodate the chain. Provision for draining wash water and cleaning the trench can, in some locations in which car wash plants are set up, prove difficult and costly. Furthermore, a trench in a floor of a building reduces available head room in a floor below.

The surface type conveyor in which chain sprockets are mounted on vertical axis eliminates the requirement of a trench and is therefore amenable for use in locations where drainage and other problems, as above described, are met.

Effort to obtain high plant effectiveness has resulted in development of trench and surface conveyors wherein the automobile pushing units can, selectively, be brought into engagement with a tire of an automobile which has been positioned in readiness to proceed through plant washing facilities. This type of conveyor is termed a demand conveyor. Demand conveyors of the trench type have proven successful both as to cost of installation and maintenance and also as to effectiveness and simplicity of operation. Most trench type demand conveyors are arranged so that pushing units, normally pass on an upper run of the endless chain, in a hidden position beneath a floor and can be moved, selectively, to an operative position above the floor so as to engage a tire of an automobile.

With surface type conveyors, however, as the automobile pushing units must travel at floor level between sprockets prior art surface type demand conveyors are not as simple in operation as demand conveyors of the trench type.

In some demand conveyors of the surface type mechanism is provided automobile pushing units can be selectively connected to or disconnected from a continuously moving chain. Conveyors of this type, however, require relatively complicated mechanisms automatically to disconnect and connect moveable parts which, due to the conditions under which the conveyors are operated, i.e., in the presence of water and abrasive materials, are frequently subject to malfunction.

SUMMARY OF THE INVENTION

The present invention provides a demand surface type conveyor which is so constructed to enable automobile pushing units to be moved, selectively, into engagement with a tire of an automobile waiting in readiness so as to push the latter the length of the conveyor and then, automatically, to be moved to an inoperative position relative to the tire when the automobile has travelled a required distance.

The conveyor of the present invention, is relatively simple in operation and, as the pushing units move continuously with the chain, connecting and disconnecting mechanisms are not required.

The conveyor of the present invention includes an endless conveyor chain having advance and return runs disposed, effectively, at floor level, a track adjacent one side of the advance run adjacent to which tires of wheels of one side of an automobile are adapted to run, a plurality of automobile pushing units each having pushing rollers mounted on the chain at spaced intervals, the rollers being swingable in a plane tranversely of direction of travel of the advance run of the chain, means at a lead end of the advance run selectively for swinging any of the rollers between an operative tire engaging position across the track and an inoperative position clear of the track, and means at a tail end of the advance run to enable each roller to swing automatically from its operative position to its inoperative position clear of the track so as to disengage the automobile tire.

A detailed description following, related to drawings, gives exemplification of apparatus according to the invention which, however, is capable of expression in means other than those particularly described and illustrated.

DESCRIPTION OF THE DRAWINGS

FIG. 1 is a diagrammatic plan showing a conveyor of the invention,

FIG. 2 is an elevation of the conveyor,

FIG. 4 is a section on 4—4 FIG. 3, FIG. 5, on sheet 4 of the drawings, is a section on 5—5 FIG. 3, FIG. 6 is an enlarged section on 6—6 FIG. 1 showing, in broken outline, automobile pushing units in operative and inoperative positions, FIG. 7 is an enlarged side view of a portion of the conveyor as seen from 7—7 FIG. 1, FIG. 8 is an enlarged plan of the portion of the conveyor shown in FIG. 7.

DETAILED DESCRIPTION

FIGS. 1 and 2

Figure 3:
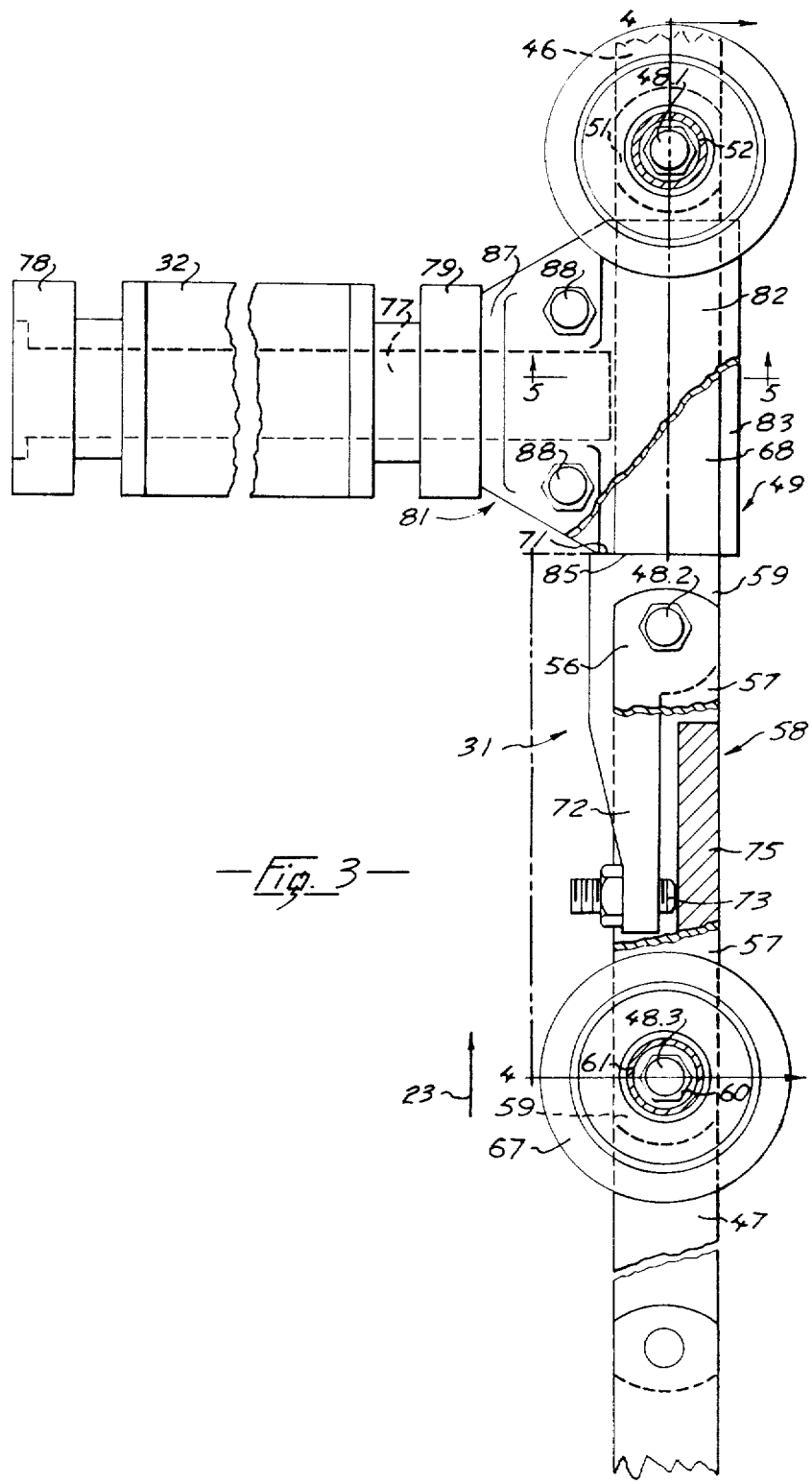
FIG. 3 is an enlarged plan of an automobile pushing unit mounted on a portion of a conveyor chain.

FIGS. 1 and 2 show, diagrammatically, a conveyor, generally 10 on a floor 11, FIG. 2, of an automobile wash plant. The conveyor extends through washing facilities, not shown, and includes an endless roller chain 12 having a medial axis 12.2, see FIG. 2. The chain passes around a front sprocket 14 and a rear sprocket 15 mounted on vertical shafts 16 and 17 respectively projecting upwards out of wells 14.1 and 15.1 in the floor 11, the sprockets being disposed so that the chain is effectively slightly above (approximately 1 inch) floor level. The rear sprocket 15 is driven by an electric motor 18 through reduction gearing 19 providing an advance run 20 moving in a direction as shown by an arrow 23, and a return run 21, the advance run having a travel axis 12.1, see FIG. 1, tangential to the sprockets.

A housing 26, shown only partially and in broken outline, covers the chain, the sprockets, and the wells. The width of the conveyor including the housing 26 is such that it can be straddled by wheels of an automobile, rear wheels 27 and 27.1 only being shown. A supporting track 28 having outer and inner guides 29 and 30 for guiding an automobile extends adjacent and parallel to the advance run 20 of the chain.

Pushing units 31 are mounted on the chain at regularly spaced intervals each unit having a pushing roller 32 (approximately three inches in diameter) which is freely swingable in a plane transversely of the chain. Diameter and depth of the wells enable the pushing rollers to hang freely in a vertical dependent position on passage around the sprockets.

As each roller in a vertically depending position passes off the front sprocket 14 it meets a gate 33 in the well 14.1 which is moveable between closed and normally open positions. In its open position the gate diverts the pushing rollers to a ramp 34 which swings each pushing roller upwards and inwards to a horizontal inoperative position beneath the housing 26 inside and clear of the track, the roller then travelling in this position to the well (FIG. 1) where it again swings to a vertical dependent position for passage around the sprockets 15. A ramp 37 in the well is engaged by and swings each roller passing off the sprocket 15 inwards to a horizontal position for return on the return run of the chain back to the well 14.1 where it again swings to a vertical dependent position.

In its closed position the gate diverts a pushing roller passing off the sprocket 14 onto a ramp 39 which swings the roller upwards and outwards to a horizontal operative position extending transversely across the track 28. The roller then travels along the track until it reaches the well where it again swings to a vertical dependent position for travel around the sprocket 15.

The rollers passing along the track are supported by supporting rails 41 and 42. Further, supporting rails 43 and 44 support the rollers in inoperative positions on the advance and return runs of the chain.

FIGS. 3, 4, 5 and 8

FIGS. 3 and 4 show a portion of the advance run of the chain and a pushing unit 31 connected thereto. The chain, see FIGS. 1, 2 and 3, has successive pairs of outside link plates 46 and inside link plates 47 linked at overlapping ends for articulation on transverse link pins, severally 48, see FIG. 1, each pair of link plates constituting a link in the chain and being spaced apart equidistantly on opposite sides of the medial axis 12.1 of the chain. The pushing unit has a length which is the same as that of a pair of adjacent links in the chain and is connected, see FIGS. 3 and 4, between a pair of outside link plates 46 and a pair of inside link plates 47.

The pushing unit, FIGS. 3 and 4, has a carrying link 49 having an apertured head portion 51, FIG. 4, mounted on a link pin 48.1 extending through a bushing 52 between ends of a pair of link plates 46, and an apertured tail portion 54 mounted in a similar manner on a link pin 48.2 which passes through end portions 56 of a pair of link plates 57 of a connecting link 58. Opposite end portions 59 of the link plates 57 are connected to a pair of inside link plates 47 by a link pin 48.3, on which inner and outer spacer bushings 60 and 61 are fitted.

The link pin 48.1 which is longer than other link pins, such as the pin 48.2, has an extending upper end portion 62 on which a guide roller 63 is mounted. As seen in FIG. 4 the guide roller 63 is mounted on a bushing 64 disposed between a head 65 of the pin 48.1 and an uppermost one of the link plates 46. The link pin 48.3 also carries a guide roller 67 which is similar to, and mounted in the same manner as, the roller 63.

The carrying link 49, FIG. 4, has a long cylindrical central portion 68 having an axis 69 offset above and extending parallel to the medial axis 12.1 of the chain. The central portion 68 terminates at a shoulder 71 constituting a rearwardly directed extension 72 which extends aft of the pin 48.2 between the link plates 57. A set screw 73 passes through the extension 72 and bears on a stop block 75 welded between the link plates 57.

The extension acts as a brace and limits articulation of the pushing unit about the pin 48.2 from a position in which the pins 48.1, 48.2 and 48.3 are aligned, towards a position in which the chain (see FIG. 8), can deflect for passage around the sprockets.

The pushing roller 32, FIG. 3, is mounted for rotation between a pair of supporting rollers 78 and 79, on a cantilever shaft 77 said shaft 77 being mounted by means of a clamp, generally 81, for rotation about the central portion 68 of the carrying link 49. As seen in FIGS. 3 and 5 the clamp 81 has grooved clamping plates 82 and 83 which fit together to provide a sleeve 85 within which the central portion 68 of the carrying link has a rotatable fit, the sleeve having an end 85 which bears on the shoulder 71. Complemental grooves in both of the plates form a socket 86, see FIG. 5, which extends perpendicular to the sleeve 84 and which receives an inner end portion 87 of the cantilever shaft 77. The plates, FIG. 3, are clamped over the end portion 87 of the cantilever shaft by bolts 88.

FIGS. 1 and 6

FIG. 6 shows the housing 26, in solid outline, with the pushing rollers in broken outline, being shown in operative and inoperative positions, 32.1 and 32.2, respectively.

The housing, FIG. 6, has a base plate 91 which is bolted to the floor and which has a central portion 92 extending from well to well and a track portion 93 which bridges the wells. The track portion has a transverse opening 95, FIG. 1, adjacent the sprocket 14 to provide passage for pushing rollers lifted to their operative positions by the ramp 39, and has a similar opening 96 adjacent the sprocket 16 through which the pushing roller can swing to vertical position for passage around the sprocket 16. The openings 95 and 96 are a little greater than three inches in width.

The rails 41, 42, 43 and 44, FIGS. 1 and 6, are welded to the base plate, the rails 41 and 42 being positioned in alignment with the supporting rollers 78 and 79 so that the pushing rollers are supported for free rotation clear of and above the track portion 93 of the base plate.

The housing, FIG. 6, includes a cover plate 97 which is supported at one edge 98 clear of the base plate by a pair of bolted angles 99 which extend the full length of the housing, being intercepted at intervals for cleaning purposes, and by an angle and channel support 101 located between the advance and return runs of the chain. A portion 102 of the cover plate is cantilevered over the supporting rail 43, and terminates at a free edge 103 which acts as the inner guide 30. The outer guide 29 is of hollow generally rectangular section and is mounted on supports 106 welded to the base plate.

A first guide track formed by a pair of angles 104—104 welded to the cover plate adjacent the edge 103 receives the guide rollers 63 and 67 as the chain passes off the sprocket 14. An angle 105 welded to the cover plate and the support 101 serve as a second guide track for receiving the guide rollers as the chain passes off the sprocket 15. The guide tracks support the chain clear of the base plate 91 on both the advance and return runs and prevent chain articulation about the pins 48.1 and 48.3 so that the pushing rollers do not deflect underload.

FIGS. 7 and 8

The ramps 34 and 39 slope downward from the supporting rails 43 and 41 into the well 14.1 and converge at lower ends 34.1 and 39.1. The gate generally 33 has a vertically disposed sleeve 107 mounted at the lower ends of the ramps the sleeve receiving a pin 108 which rotates an axis 108.1, FIG. 7, intersects the travel axis 12.1, FIG. 8, of the advance run of the chain. A deflecting finger 109 is mounted on an upper end of the pin 108 for swinging movement between an opening position, as shown in broken outline 109.1, FIG. 8, and a normal closed position, as shown in solid outline. An over-center acting tension spring 110 extending between an operative arm 111, FIG. 8, at a lower end of the pin 108 and ramp framework 112 restrains movement of the finger 109 both from its open and from its closed positions.

As seen in FIG. 8 the finger 109 in its closed position extends inward relative to the travel axis 12.2 of the chain so as to deflect one pushing roller passing off the sprocket 14 onto the ramp 39 which swings the pushing roller through the opening 95 onto the supporting rails 41 and 42. The finger when positioned in its open position 109.1 extends outwards of the travel axis of the chain and diverts the pushing rollers passing off the sprocket 14 onto the ramp 34 which swings the rollers upwards out the well 14.1 onto the supporting rail 43. Movement of the finger 109 from its open position to its closed position is effected by operation of an operating cable 112 connected to the operating arm 111 — the cable being operated from a suitable remote location by a plant attendant. It is to be understood that remotely operated electrically activated devices can be used in place of the cable.

Movement of the finger 109 from its closed to its open position is automatically effected by engagement of any pushing roller with a lever 114 operably connected to the pin 108, at an angle to the ramp 39 when the lever is closed. Any pushing roller diverted by the finger, in a closed position, onto the ramp 39 strikes the lever 114 and moves the finger 109, against the action of the tension spring 110 to an open position so that pushing rollers following are diverted onto the ramp 34. The gate, it is seen allows only one pushing roller at a time, and when demended, to be swung up onto the track 28.

The ramp 37 is not illustrated in detail. It extends, see FIG. 1, across the path of pushing rollers passing off the sprocket 15 so as to swing the pushing roller onto the supporting rail 44 for return to the well 14.1.

OPERATION

To move an automobile through plant washing facilities it is driven under its own power over the conveyor with wheels on one side of the car, in this instance the left hand wheels, on the track 28 between the inner and outer guides until the rear left hand wheel 27 passes over the opening 95. The gate is then operated to send a pushing roller up the ramp 39 and onto the track 28 behind the wheel 27. The automobile is pushed along the track until the pushing roller reaches the opening 96 where it swings away from the wheel 27 into the well 15.1. The automobile is then driven, under its own power, off the conveyor.

It is seen that the automobile wheels meet no obstruction in their passage along the track 28 other than the openings 95 and 96. As the openings are little more than three inches in width they have little effect on an automobile running over them.

I claim:
1. An automobile conveyor including:
   a. an endless roller chain disposed in a horizontal plane between front and rear sprockets mounted for rotation about a vertical axis, the chain having an advance run and return run disposed substantially at floor level,
   b. a plurality of automobile pushing units spaced at intervals along the chain, each unit having an automobile tire pushing roller freely swingable in a plane transverse to the chain,
   c. means at each sprocket to enable each of the pushing rollers to move in a vertical position around the sprockets,
   d. a supporting track outside of and parallel to the advance run along which tires of wheels of one side of an automobile run, the track having an opening adjacent the front sprocket to enable the pushing rollers passing off the front sprocket to be swung from a vertical dependent position to a horizontal floor level operable position extending transversely across the track and to be swung to a horizontal floor level inoperative position clear of the track,
   e. means, as each unit passes off the front sprocket, for selectively swinging each pushing roller to its operative position and to its inoperative position,
   f. means adjacent the rear sprocket to enable each pushing roller travelling along the track to swing to a vertically depending position for passage around the rear sprocket.
2. A conveyor as claimed in claim 1 in which the means (c) are wells.
3. A conveyor as claimed in claim 2 in which the means (f) is an opening in the track above the well.
4. A conveyor as claimed in claim 1 including:
   g. a guide track extending above and parallel to the advance run of the chain,
   h. guide rollers mounted on each pushing unit ahead of and behind each pushing roller, the guide rollers being received by the guide track for maintaining each pushing roller in a position extending transversely across the supporting track.
5. A conveyor as claimed in claim 1 in which each pushing unit includes:
   i. a cylindrical carrying shaft constituting a link in the chain,
   ii. a cantilever shaft on which a pushing roller is mounted, the cantilever shaft having an axis disposed at right angles to the carrying shaft,
   iii. a clamp mounted for rotation on the carrying shaft and clamping one end of the cantilever shaft,
   iv. means on the cantilever shaft adapted to support the pushing roller clear of and above the track when the roller is in its operative position.
6. A conveyor as claimed in claim 5 including:
   i. guide rollers mounted on each pushing unit ahead of and behind said carrying shaft and,
   ii. guide tracks disposed longitudinally of and above the advance run of the chain adapted to receive the guide rollers for maintaining the cantilever shaft in a position extending transversely across the supporting track.
7. A conveyor as claimed in claim 5 in which the means (iv) includes supporting rollers mounted on the cantilever shaft at opposite ends of each pushing roller for supporting the pushing rollers clear of the supporting track.
8. A conveyor as claimed in claim 1 in which the means (e) includes:
   i. a gate disposed below the advance run of the chain for engaging each pushing roller as the latter passes off the head sprocket, the gate being swingable between a closed position for swinging a pushing roller towards its operative position and an open position for swinging each pushing roller about the chain to its inoperative position and,
   ii. ramps sloping upwards from the gate to floor level on opposite sides of the advance run of the chain for swinging the pushing rollers about the chain to horizontal floor level positions.
9. A conveyor as claimed in claim 8 including:
   i. an over-center acting tension spring connected to the gate for restraining movement of the gate from its closed and from its open positions,
   ii. a lever connected to the gate engageable by a pushing roller diverted towards an operable position for swinging the gate, against the action of the spring, to a closed position so that pushing rollers following are swung towards an inoperable position and
   iii. operator controlled means for swinging the gate from its open to its closed position.

* * * * *